United States Patent Office 3,184,619
Patented May 18, 1965

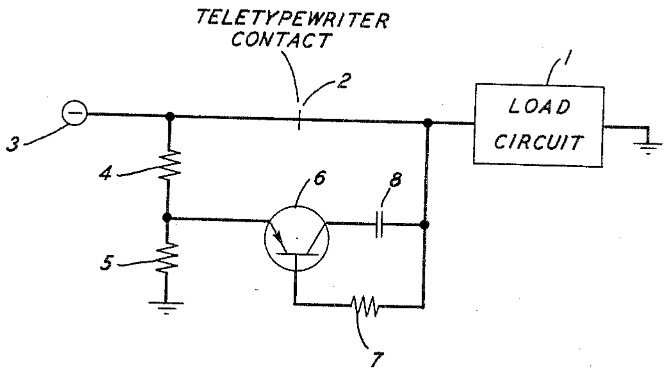
INVENTOR
H. M. ZYDNEY
BY
R C Lipton
ATTORNEY

3,184,619

CONTACT NOISE SUPPRESSOR

Herbert M. Zydney, New York, N.Y., assignor to Bell Telephone Laboratories, Incorporated, New York, N.Y., a corporation of New York Filed Aug. 30, 1962, Ser. No. 220,481
6 Claims. (Cl. 307—134)

This invention relates to a contact noise suppressor and, more particularly, to a circuit for suppressing the effects of contact bounce noise produced by contacts such as the sending contacts of a teletypewriter.

A broad object of this invention is to suppress the effects of contact bounce.

In frequency-shift telegraph and data transmission systems the mark and space data signals generated by the sending teletypewriter are repeated to the frequency-shift modulator by an electronic keying circuit. The generated mark signal is produced by the closure of the sending contacts of the teletypewriter and the spacing signal is generated by the opening of the contacts. Upon closure, however, the contacts of the teletypewriter are subject to bounce which appear as partial opens in the pulses that are marking. These partial opens are usually of short duration and have a relatively small amplitude with respect to the voltage swing between the mark signal and the space signal. The short duration spike, after being amplified by the electronic keying circuit, momentarily switches the modulator to the spacing frequency, reducing the transmitted energy of the marking signal and consequently reducing the noise performance of the receiving set.

It is well known to overcome contact noise spikes by connecting an integrating capacitor across the input of the electronic keying circuit. The integrating circuit necessarily must have a time constant sufficiently long to suppress a burst of contact noise spikes. The long time constant of the circuit tends to unduly elongate the marking pulse, however, when the signal is switched from the marking to the spacing condition.

Accordingly, it is an object of this invetion to overcome contact noise without unduly elongating the pulses generated by the contact.

In accordance with a preferred embodiment of the present invention the integrating capacitor is connected in series with the emitter-to-collector path of a transistor across a load circuit, which load circuit may constitute the input of an electronic keying circuit. The base of the transistor is connected to the load input and the emitter is forward biased, rendering the transistor conductive during the marking condition when the contact is closed. Accordingly, when the contact is closed and a marking signal is being transmitted, the capacitor charges through the closed contact and the emitter-to-collector path of the transistor. When the contact opens for the spacing pulse, or due to contact bounce, the capacitor discharges through the load circuit and the emitter-to-collector path of the transistor, prolonging the marking condition to overcome contact noise. After a short spacing interval, however, the capacitor discharge lowers the load input potential and consequently the base potential, sufficiently to overcome the emitter forward bias. This turns OFF the transistor, opening the capacitor discharge path, and thus terminating the marking pulse delay.

The means for fulfilling the forgoing objects and the practical embodiment of the features of this invention will be fully understood from the following description taken in conjunction with the accompanying drawing which shows a schematic diagram of a preferred arrangement of a contact noise suppressor circuit.

Referring now to the drawing, a load circuit is generally indicated by block 1. The load circuit preferably comprises the input to an electronic keying circuit which is well known in the art. Normally-closed contact 2, which may comprise a teletypewriter sending contact, is connected to load 1 and when closed functions to connect grounded negative potential source 3 across load 1. Connected across grounded negative potential source 3 is a voltage divider comprising resistors 4 and 5. Resistor 4 has an impedance value relatively small with respect to resistor 5, whereby the junction of the two resistors provides a potential slightly positive relative to the potential provided by negative voltage supply 3. Transistor 6 has its emitter connected to the junction of resistors 4 and 5 and its base connected to the input of load 1 through resistor 7. The sole connection for the collector of transistor 6 is provided by integrating capacitor 8 to the input of load circuit 1.

Assuming contact 2 is closed, as shown in the drawing, the negative potential provided by source 3 is applied across load circuit 1. In addition, the negative potential is applied through resistor 7 to the base of transistor 6. Since the emitter of transistor 6 is biased slightly positive relative to the negative potential of source 3 by the voltage divider comprising resistors 4 and 5, the emitter is forward biased relative to the base. This tends to turn transistor 6 ON, providing a low emitter-to-collector path impedance and thus substantially connecting the junction of resistors 4 and 5 to capacitor 8. A charging path for capacitor 8 is thus completed through contact 2 and the emitter-to-collector path of transistor 6, applying across capacitor 8 the potential developed across resistor 4.

When contact 2 opens, the negative potential provided by source 3 is disconnected from load circuit 1. However, the negative charge on the right-hand plate of capacitor 8, as viewed in the drawing, maintains the base of transistor 6 negative relative to the bias potential on the emitter, and thus maintains transistor 6 ON. Capacitor 8 is now provided with a discharge path by way of load circuit 1 and the emitter-to-collector path of transistor 6, retaining the negative signal voltage on the input of load circuit 1. Where the contact momentarily opens due to contact bounce, the time constant of the integrating circuit, which includes capacitor 8, is sufficient to over-ride the voltage spike thereby produced.

When contact 2 opens and capacitor 8 discharges through load circuit 1, the potential at the input of load circuit 1, and consequently the potential at the base of transistor 6 gradually rises in a positive direction toward ground. Assuming that contact 2 opens to generate a spacing pulse, after a short interval the rising potential at the base of transistor 6 is sufficient to overcome the bias provided to the emitter of transistor 6 by the voltage divider. When the emitter bias is overcome and the emitter of transistor 6 is no longer forward biased, the transistor tends to turn OFF and the emitter-to-collector path of transistor 6 appears as an open circuit to capacitor 8. Therefore, the discharge path for capacitor 8 is opened, capacitor 8 ceases to discharge through load circuit 1, and the current source presented by the right-hand plate of capacitor 8 to load circuit 1 is removed, providing an open or spacing condition to the input of load circuit 1. Accordingly, there is provided a long time constant integrating circuit which functions for a momentary initial interval after the contact is open to prolong the marking condition and which is terminated in function after the momentary initial interval to rapidly transfer the load input condition to the spacing condition without unduly elongating the marking condition.

The subsequent closure of contact 2 when the next mark signal is generated or the contact reclosed after a contact bounce again extends negative potential source 3 to the input of load circuit 1 and provides the charging path for capacitor 8 through contact 2, as previously described.

Although a specific embodiment of this invention has been shown and described, it will be understood that various modifications may be made without departing from the spirit of this invention and within the scope of the appended claims.

What is claimed is:

1. In a circuit for suppressing the effects of contact bounce, a load circuit, a source of fixed potential, a contact interconnecting said load circuit and said fixed potential, a capacitor connected to said load circuit for charging through said contact when said contact is closed and discharging through said load when said contact is open, and means for disabling said capacitor at a predetermined point of said discharge.

2. In a circuit for suppressing the effects of contact bounce in accordance with claim 1 wherein said disabling means comprises a current gate in series with said capacitor and means coupled to said load circuit and responsive to said capacitor discharge for disabling said current gate.

3. In a circuit for suppressing the effects of contact bounce, a load circuit, a source of fixed potential, a contact interconnecting said load circuit and said fixed potential, a capacitor connected to said load circuit, a current gate, means for providing a charging path for said capacitor including said contact and said current gate, means for providing the sole discharge path for said capacitor including said load circuit and said current gate, bias means coupled to said fixed potential for enabling said gate, and means coupled to said load circuit and responsive to the discharge of said capacitor for overcoming said bias means and thereby disabling said gate.

4. In a circuit for suppressing the effects of contact bounce, a load circuit, a source of fixed potential, a contact interconnecting the input of said load and said fixed potential, a capacitor having one side connected to said load input, means coupled to said fixed potential for providing a bias potential, switch means for providing the sole interconnection between said fixed potential source and the other side of said capacitor, and comparison means jointly responsive to said bias potential and to the potential at said load input for enabling said switch means.

5. In a circuit for suppressing the effects of contact bounce, a load circuit, a source of fixed potential, a contact interconnecting said load circuit and said fixed potential, a transistor having a base electrode connected to said load circuit, an emmiter electrode connected to said potential source, and a collector electrode, a capacitor providing the sole connection for said collector electrode for interconnecting said collector electrode and said load circuit, and means for forward biasing said emitter electrode.

6. In a circuit for suppressing the effects of contact bounce, a load circuit, a source of fixed potential, a contact interconnecting said load circuit and said fixed potential, a voltage divider connected across said potential source, a transistor having a base electrode, an emitter electrode and a collector electrode, a resistor interconnecting said base electrode and said load circuit, a capacitor providing the sole connection for said collector electrode for interconnecting said collector electrode and said load circuit, and means for connecting said emitter electrode to an intermediate point on said voltage divider.

References Cited by the Examiner

UNITED STATES PATENTS

| | | | |
|---|---|---|---|
| 3,075,124 | 1/63 | Bagno | 317—11 |
| 3,092,757 | 6/63 | Rosenfeld et al. | 317—11 |

LLOYD McCOLLUM, *Primary Examiner.*